(12) United States Patent
Kryzman et al.

(10) Patent No.: US 10,465,292 B2
(45) Date of Patent: Nov. 5, 2019

(54) ANTI-CORROSION AND/OR PASSIVATION COMPOSITION FOR METAL-CONTAINING SUBSTRATES AND METHODS FOR MAKING, ENHANCING, AND APPLYING THE SAME

(71) Applicant: GOODRICH CORPORATION, Charlotte, NC (US)

(72) Inventors: Michael A. Kryzman, West Hartford, CT (US); Georgios S. Zafiris, Glastonbury, CT (US); Mark R. Jaworowski, Glastonbury, CT (US); Weilong Zhang, Glastonbury, CT (US); Roque Panza-Giosa, Oakville (CA); Marilea Manzini, Maple (CA)

(73) Assignee: GOODRICH CORPORATION, Charlotte, NC (US)

( * ) Notice: Subject to any disclaimer, the term of this patent is extended or adjusted under 35 U.S.C. 154(b) by 349 days.

(21) Appl. No.: 15/288,972

(22) Filed: Oct. 7, 2016

(65) Prior Publication Data

US 2018/0100238 A1    Apr. 12, 2018

(51) Int. Cl.
*C23C 28/00* (2006.01)
*C23C 22/78* (2006.01)
(Continued)

(52) U.S. Cl.
CPC ............ *C23C 28/34* (2013.01); *C09D 5/084* (2013.01); *C23C 22/05* (2013.01); *C23C 22/73* (2013.01); *C23C 22/78* (2013.01); *C23C 24/04* (2013.01); *C23C 28/321* (2013.01); *C25D 3/22* (2013.01); *C25D 3/26* (2013.01); *C25D 3/56* (2013.01); *C25D 5/48* (2013.01)

(58) Field of Classification Search
CPC ......... C09D 5/084; C23C 22/05; C23C 22/73; C23C 22/78; C23C 24/04; C23C 28/321; C23C 28/34; C25D 3/22; C25D 3/26; C25D 3/56; C25D 5/48
USPC ........................................................ 427/333
See application file for complete search history.

(56) References Cited

U.S. PATENT DOCUMENTS 8,088,204 B2   1/2012   Taylor
9,399,714 B2   7/2016   Zhang et al.
(Continued)

FOREIGN PATENT DOCUMENTS

EP   2924079   9/2015
EP   3061847   8/2016

OTHER PUBLICATIONS

Extended European Search Report dated Jan. 9, 2018 in European Application No. 17195259.1.
(Continued)

*Primary Examiner* — Alexander M Weddle
(74) *Attorney, Agent, or Firm* — Snell & Wilmer, L.L.P.

(57) ABSTRACT

A method of disposing a corrosion resistant system to a substrate may comprise applying a plating material to the substrate; forming a chemical conversion coating solution by combining a solvent, at least one corrosion inhibitive cation comprising at least one of zinc, calcium, strontium, magnesium, or aluminum, at least one corrosion inhibitive anion comprising at least one of phosphate, molybdate, or silicate, and a complexing agent; and applying the chemical conversion coating solution to the plating material on the substrate.

12 Claims, 4 Drawing Sheets

(51) Int. Cl.
*C23C 22/05* (2006.01)
*C23C 22/73* (2006.01)
*C23C 24/04* (2006.01)
*C25D 3/22* (2006.01)
*C25D 3/26* (2006.01)
*C25D 3/56* (2006.01)
*C25D 5/48* (2006.01)
*C09D 5/08* (2006.01)

(56) References Cited

U.S. PATENT DOCUMENTS

2015/0274985 A1* 10/2015 Zhang ............... C09D 5/08
523/451
2016/0002808 A1 1/2016 Zhang et al.

OTHER PUBLICATIONS

European Patent Office, European Office Action dated Jun. 4, 2019 in Application No. 17195259.1.

* cited by examiner

ANTI-CORROSION AND/OR PASSIVATION COMPOSITION FOR METAL-CONTAINING SUBSTRATES AND METHODS FOR MAKING, ENHANCING, AND APPLYING THE SAME

BACKGROUND

Conventionally, high-performance post-treatments for metal and metal coated or plated substrates are based on hexavalent chromate chemistry. Metal coated substrates may include, for example, zinc-nickel electroplated coatings on high strength low alloy steel. Hexavalent chromium is highly toxic and a known carcinogen.

SUMMARY

Various compositions, systems, and methods are disclosed herein. In various embodiments, a method of disposing a corrosion resistant system to a substrate may comprise applying a plating material to the substrate; forming a chemical conversion coating solution by combining a solvent, at least one corrosion inhibitive cation comprising at least one of zinc, calcium, strontium, magnesium, or aluminum, at least one corrosion inhibitive anion comprising at least one of phosphate, molybdate, or silicate, and a complexing agent; and applying the chemical conversion coating solution to the plating material on the substrate.

In various embodiments, each of the at least one corrosion inhibitive cation may have a concentration in a range of $0.5 \times 10^{-3}$ moles per liter (molar) 0.5 molar in the chemical conversion coating solution. In various embodiments, each of the at least one corrosion inhibitive anion may have a concentration in a range of $0.5 \times 10^{-3}$ molar to 0.5 molar in the chemical conversion coating solution. In various embodiments, the molybdate may have a concentration in a range of $0.5 \times 10^{-3}$ molar to 0.02 molar in the chemical conversion coating solution. In various embodiments, the silicate may have a concentration in a range of 0.005 molar to 0.02 molar in the chemical conversion coating solution. In various embodiments, the complexing agent may have a concentration in a range of $0.5 \times 10^{-3}$ molar to 0.5 molar in the chemical conversion coating solution.

In various embodiments, forming the chemical conversion coating may further comprise adding an organic binder into the chemical conversion coating solution. In various embodiments, the corrosion inhibitive cation may be provided by at least one of zinc chloride, zinc sulfate, zinc nitrate, zinc molybdate, calcium molybdate, magnesium molybdate, zinc silicate, magnesium silicate, calcium silicate, zinc oxide, zinc phosphate, aluminum phosphate, magnesium phosphate, calcium phosphate, zinc calcium strontium aluminum orthophosphate silicate, calcium chloride, calcium sulfate, calcium nitrate, strontium chloride, strontium sulfate, strontium nitrate, aluminum chloride, aluminum sulfate, or aluminum nitrate. In various embodiments, the corrosion inhibitive anion may be provided by at least one of sodium phosphate, sodium silicate, sodium vanadate, zinc molybdate, calcium molybdate, sodium molybdate, magnesium molybdate, zinc silicate, magnesium silicate, calcium silicate, sodium silicate, zinc phosphate, aluminum phosphate, magnesium phosphate, calcium phosphate, zinc calcium strontium aluminum orthophosphate silicate, sodium nitrite, phosphoric acid, silicic acid, vanadic acid, and/or molybdic acid. In various embodiments, the complexing agent may comprise at least one of ethylenediaminetetraacetic acid (EDTA), nitrilotracetic acid (NTA), oxalic acid, formic acid, acetic acid, tartaric acid, nicotinic acid, citric acid, or malonic acid. In various embodiments, the organic binder may comprise at least one of polyvinyl alcohol, polyvinylpyrrolidone, polyvinyl acetate, or an acrylic.

In various embodiments, the method may further comprise forming a corrosion resistant coating by combining a corrosion inhibition composition and an application vehicle, and applying the corrosion resistant coating to the substrate, wherein the corrosion inhibition composition may comprise a zinc oxide, a zinc phosphate, a calcium silicate, an aluminum phosphate, a zinc calcium strontium aluminum orthophosphate silicate hydrate, a molybdate compound, and/or a silicate compound. In various embodiments, the molybdate compound may comprise between 10% and 90% by weight of the corrosion inhibition composition. In various embodiments, the silicate compound may comprise between 10% and 90% by weight of the corrosion inhibition composition. In various embodiments, the zinc oxide, the zinc phosphate, the calcium silicate, the aluminum phosphate, and the zinc calcium strontium aluminum orthophosphate silicate hydrate, collectively, may comprise between 10% and 90% by weight of the corrosion inhibition composition.

In various embodiments, a corrosion inhibition system disposed on a substrate may comprise a plating material; and a chemical conversion coating comprising a corrosion inhibitive cation comprising at least one of zinc, calcium, strontium, magnesium, or aluminum, a corrosion inhibitive anion comprising at least one of phosphate, molybdate, or silicate, and a complexing agent. In various embodiments, the corrosion inhibitive cation may be provided by at least one of zinc chloride, zinc sulfate, zinc nitrate, zinc molybdate, calcium molybdate, magnesium molybdate, zinc silicate, magnesium silicate, calcium silicate, zinc oxide, zinc phosphate, aluminum phosphate, magnesium phosphate, calcium phosphate, zinc calcium strontium aluminum orthophosphate silicate, calcium chloride, calcium sulfate, calcium nitrate, strontium chloride, strontium sulfate, strontium nitrate, aluminum chloride, aluminum sulfate, or aluminum nitrate. In various embodiments, the corrosion inhibitive anion may be provided by at least one of sodium phosphate, sodium silicate, sodium vanadate, zinc molybdate, calcium molybdate, sodium molybdate, magnesium molybdate, zinc silicate, magnesium silicate, calcium silicate, sodium silicate, zinc phosphate, aluminum phosphate, magnesium phosphate, calcium phosphate, zinc calcium strontium aluminum orthophosphate silicate, sodium nitrite, phosphoric acid, silicic acid, vanadic acid, and/or molybdic acid. In various embodiments, the corrosion inhibition system may further comprise a corrosion inhibition composition disposed adjacent to the chemical conversion coating comprising a zinc oxide, a zinc phosphate, a calcium silicate, an aluminum phosphate, a zinc calcium strontium aluminum orthophosphate silicate hydrate, a molybdate compound, and a silicate compound.

In various embodiments, a chemical conversion coating solution may comprise a solvent; at least one corrosion inhibitive cation comprising at least one of zinc, calcium, strontium, magnesium, or aluminum; at least one corrosion inhibitive anion comprising at least one of phosphate, molybdate, or silicate; and a complexing agent. In various embodiments, each of the at least one corrosion inhibitive cation may have a concentration in a range of $0.5 \times 10^{-3}$ molar to 0.5 molar in the chemical conversion coating. In various embodiments, each of the at least one corrosion inhibitive inhibitive anion may have a concentration in a range of $0.5 \times 10^{-3}$ molar to 0.5 molar in the chemical conversion coating.

DETAILED DESCRIPTION

Figure 1A:
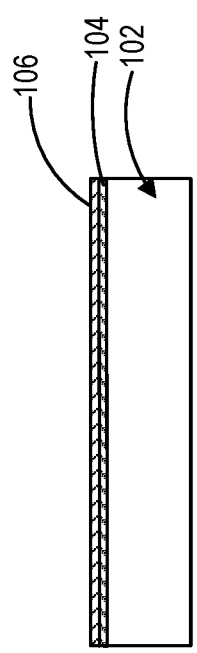
FIGS. 1A and 1B illustrate corrosion inhibition systems coated on substrates, in accordance with various embodiments.

All ranges and ratio limits disclosed herein may be combined and include their upper and lower limits. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical, chemical, and/or mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Corrosion inhibition systems used on metal and metal coated substrates are used in many industries. For example, aircraft landing gear often contains metal-coated substrates in landing gear components, which may be overcoated with a corrosion inhibition system. Metal and/or metal-coated substrates are also used in other contexts, such as in other vehicles such as automobiles, trains, and heavy equipment. In addition, metal coated substrates are found in construction contexts, such as used on building infrastructures.

In various embodiments, a corrosion inhibition system may comprise a plating material, a chemical conversion coating, and/or a corrosion inhibition composition, as described herein. As used herein, a "substrate" may include any metal and/or metal coated material. For example, a substrate may comprise iron, coated iron, steel, coated steel, stainless steel, coated stainless steel, nickel, coated nickel, aluminum, coated aluminum, bronze, coated bronze, copper beryllium, coated copper beryllium, zinc, and/or coated zinc.

In various embodiments, stainless steel may comprise a high strength stainless steel and may comprise a martensitic precipitation-hardening stainless steel such as 15-5PH® manufactured by AK Steel 9227 Centre Pointe Drive, West Chester, Ohio 45069 which may comprise 14 to 15.5% by weight chromium, 3.5 to 5.5% by weight nickel, 2.5 to 4.5% by weight copper, 0.15 to 0.45% by weight columbium plus tantalum, and a maximum of 0.07% by weight carbon, 1.0% by weight manganese, 0.04% by weight phosphorus, 0.03% by weight sulfur, and 1.0% by weight silicon. In various embodiments, a substrate may comprise a chromium-nickel-tungsten martensitic alloy (also known as Greek Ascoloy). In various embodiments, steel may comprise a high strength, low-alloy steel such as 4340 or 300M.

In various embodiments, a substrate may comprise a metal that is coated with a plating material. A plating material may be applied by electroplating, cold spraying or other suitable methods. Plating materials may comprise one or more metals, such as nickel (Ni), zinc (Zn), cadmium (Cd), titanium (Ti) and combinations thereof. For example, in various embodiments, a substrate may comprise a coated steel or low alloy steel (e.g., 300M steel) comprising a Zn—Ni plating material. In various embodiments, a substrate may comprise a coated steel or low alloy steel comprising a cadmium (Cd) and/or a titanium-cadmium (TiCd) plating material. In various embodiments, a substrate may comprise a zinc alloy or zinc-nickel alloy. In various embodiments, a substrate may comprise a coated steel comprising a zinc plating material, and/or galvanized steel. In various embodiments, a substrate may comprise bare steel, and/or bare stainless steel. In various embodiments, a substrate may comprise aluminum-nickel-bronze alloys and/or copper alloys. In various embodiments, a substrate may comprise aluminum and aluminum alloys.

In various embodiments, a chemical conversion coating solution may be applied to the plating material on the substrate. The chemical conversion coating, which is the chemical conversion coating solution less the solvent (i.e., after drying), in conjunction with the plating material, may be configured to inhibit the corrosion of and protect the underlying substrate. In various embodiments, the chemical conversion coating solution may be a solution comprising a solvent (i.e., water), and a mixture of chemical conversion constituents. In various embodiments, the chemical conversion constituents may comprise a corrosion inhibitive cation species, and corrosion inhibitive anion species, and a complexing agent, where the corrosion inhibitive cation species and the corrosion inhibitive anion species are ions that exist in solution. In various embodiments, the inhibitive cation species may be any one or combination of a zinc species ($Zn^{2+}$), a calcium species ($Ca^{2+}$), a strontium species ($Sr^{2+}$), an aluminum species ($Al^{3+}$), a cerium species ($Ce^{3+}$), a magnesium species ($Mg^{2+}$), and/or a chromium species ($Cr^{3+}$) in solution. In various embodiments, the corrosion inhibitive anion species may be any one or combination of a molybdate species, a silicate species, a phosphate species, a vanadate species, a peroxide species, and/or a nitrate species in solution.

The corrosion inhibitive cation species and the corrosion inhibitive anion species may be provided by any soluble compound(s) to create a chemical conversion coating solution. In various embodiments, any of the corrosion inhibitive cation species may be provided by any soluble ionic compound, for example, comprising chloride, nitrate, sulfate, silicate, molybdate, phosphate, orthophosphate or any other suitable anion. In various embodiments, any of the corrosion inhibitive anion species may be provided by any soluble ionic compound, for example, comprising a zinc cation, magnesium cation, calcium cation, aluminum cation, strontium cation, and/or any other suitable species. In various embodiments, any of corrosion inhibitive anion species may be provided by the anion species in its acid form, such as phosphoric acid providing phosphate, silicic acid providing silicate, and/or vanadic acid providing vanadate. The addition of the complexing agent to the chemical conversion coating solution allows the corrosion inhibitive cations and anions to exist in solution without reacting with one another to prevent, among other things, precipitation of some species.

In various embodiments, the complexing agent may be ethylenediaminetetraacetic acid (EDTA), nitrilotracetic acid (NTA), oxalic acid, formic acid, acetic acid, tartaric acid, nicotinic acid, citric acid, malonic acid, or any other suitable compound. In various embodiments, the chemical conversion coating solution may comprise an application vehicle to aid the application of the chemical conversion coating to the plating material on a substrate. In various embodiments, the application vehicle may be an organic binder such as polyvinyl alcohol (PVA), polyvinylpyrrolidone (PVP), polyvinyl acetate, an acrylic, and/or any other suitable compound. In various embodiments, the application vehicle may be a heat transfer fluid, machining coolant, lubricant, or any other suitable substance. The machining coolant may be, for example, a semi-synthetic water-based machining coolant.

In various embodiments, the corrosion inhibitive cation species and/or the corrosion inhibitive anion species may have a concentration in a range of $0.5 \times 10^{-3}$ molar to 0.5 molar in the chemical conversion coating solution. In various embodiments, the corrosion inhibitive cation species and/or the corrosion inhibitive anion species may have a concentration in a range of $0.5 \times 10^{-3}$ molar to 0.05 molar in the chemical conversion coating solution. In various embodiments, the corrosion inhibitive cation species and/or the corrosion inhibitive anion species may have a concentration in a range of 0.001 molar to 0.01 molar in the chemical conversion coating solution. That is, any or all corrosion inhibitive cation species, and/or any or all corrosion inhibitive anion species, individually or in combination, may have the concentrations discussed above in the chemical conversion coating solution.

Figure 2:
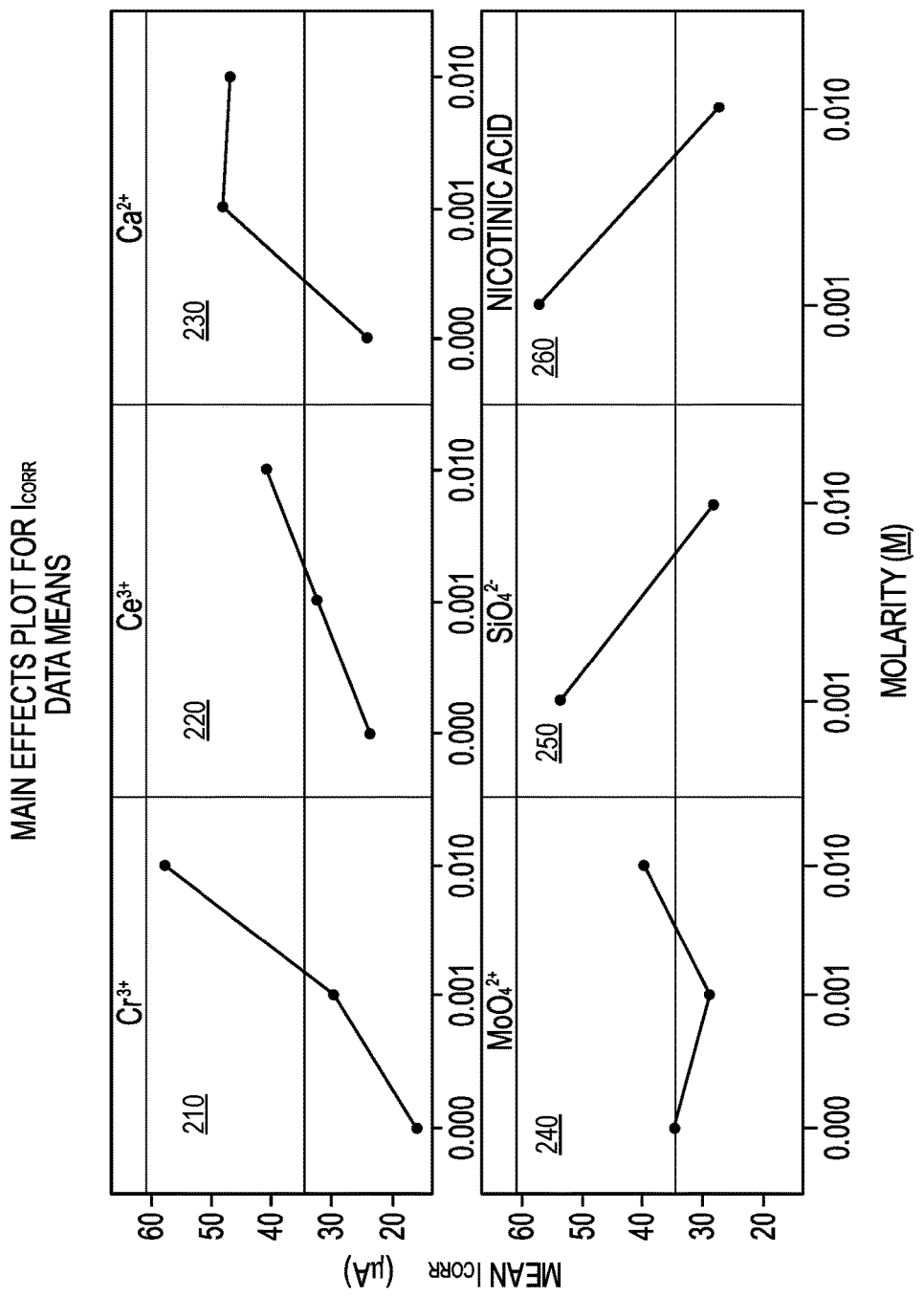
FIG. 2 illustrates a chart depicting the effect on corrosion current by varying one species in solution, in accordance with various embodiments.

Various corrosion inhibitive cation species and corrosion inhibitive anion species have shown more of a potential to aid in corrosion protection of a substrate when existing in a solution and applied to the substrate. With reference to FIG. 2, the charts depicted therein have the mean corrosion current (Icorr) measured in microamperes (μA) on the y-axis, and the molarity on the x-axis. The lower the corrosion current, the more effective a species is at preventing corrosion. A lower corrosion current reflects less current passing between the protective coating and the solution applied to the substrate (3500 ppm NaCl), which means less corrosion of the underlying substrate. Each chart, 210-260 shows corrosion inhibition systems varying the respective corrosion inhibitive cation or anion, wherein the corrosion inhibition system comprises each of the six species in the charts 210-260. For example, chart 210 shows a varying molarity of the chromium ($Cr^{3+}$) cation in a corrosion inhibition system. As can be seen in charts 210, 220, and 230, the chromium, cerium, and calcium cations, increase the corrosion current in response to their increased molarities in a corrosion inhibition system. Therefore, relatively greater concentrations may allow more corrosion of the underlying substrate. On the other hand, relatively higher concentrations of silicate (a corrosion inhibitive anion) and nicotinic acid (a complexing agent) decrease the corrosion current, and thus increases corrosion protection. Finally, a relatively lower concentration (between zero molar and 0.01 molar) of molybdate (a corrosion inhibitive anion) is most effective at lowering corrosion current.

Accordingly, in addition to the various concentration ranges for constituents of the chemical conversion coating solution discussed herein, in various embodiments, the molybdate corrosion inhibitive anion may have a concentration in a range of $0.5 \times 10^{-3}$ molar to 0.5 molar. In various embodiments, the molybdate compound may have a concentration in a range of $0.5 \times 10^{-3}$ molar to 0.02 molar in the chemical conversion coating solution. In various embodiments, the molybdate compound may have a concentration in a range of $0.5 \times 10^{-3}$ molar to 0.002 molar in the chemical conversion coating solution. In various embodiments, the molybdate compound may have a concentration in a range of 0.0008 molar to 0.0015 molar in the chemical conversion coating solution. In various embodiments, the molybdate compound may have a concentration of about 0.001 molar in the chemical conversion coating solution. The term "about" as used in this context only means plus or minus 0.0005 molar. In various embodiments, the silicate corrosion inhibitive anion and/or the complexing agent may have a concentration in a range of $0.5 \times 10^{-3}$ molar to 0.5 molar. In various embodiments, the silicate corrosion inhibitive anion may have a concentration in a range of 0.005 molar to 0.02 molar in the chemical conversion coating solution. In various embodiments, the silicate compound anion may have a concentration in a range of 0.008 molar to 0.015 molar in the chemical conversion coating solution. In various embodiments, the silicate compound anion may have a concentration of about 0.010 molar in the chemical conversion coating solution. The term "about" as used in this context only means plus or minus 0.002 molar.

In various embodiments, the complexing agent may have a concentration that matches the concentration of the corrosion inhibitive cation species and/or the corrosion inhibitive anion species. Accordingly, the complexing agent may have a concentration in a range of 0.0005 molar to 0.020 molar in the chemical conversion coating solution. In various embodiments, the complexing agent may have a concentration in a range of 0.001 to 0.01 molar in the chemical conversion coating solution. In various embodiments, the complexing agent may have a concentration in a range of 0.005 to 0.02 molar in the chemical conversion coating solution. In various embodiments, the organic binder may have a mass concentration of 0.05 to $0.7 \times 10^{-3}$ molar in the chemical conversion coating solution. In various embodiments, the organic binder may have a mass concentration of 0.1 to $0.5 \times 10^{-3}$ molar in the chemical conversion coating solution.

In various embodiments, the chemical conversion coating solution may comprise sulfuric acid, nitric acid, ammonium hydroxide, or any other suitable acid or base to regulate the pH of the chemical conversion coating solution. In various embodiments, the chemical conversion coating solution may have a pH between 3 and 5. In various embodiments, the chemical conversion coating solution may have a pH between 3 and 4.5. In various embodiments, the chemical conversion coating solution may have a pH between 3.6 and 4. Additionally, in various embodiments, the chemical conversion coating solution may comprise hydrogen peroxide and/or a permanganate compound, such as potassium permanganate, to increase the oxidizing strength (i.e., the bonding of the chemical conversion coating solution with the plating material) of the chemical conversion coating solution.

Figure 3:
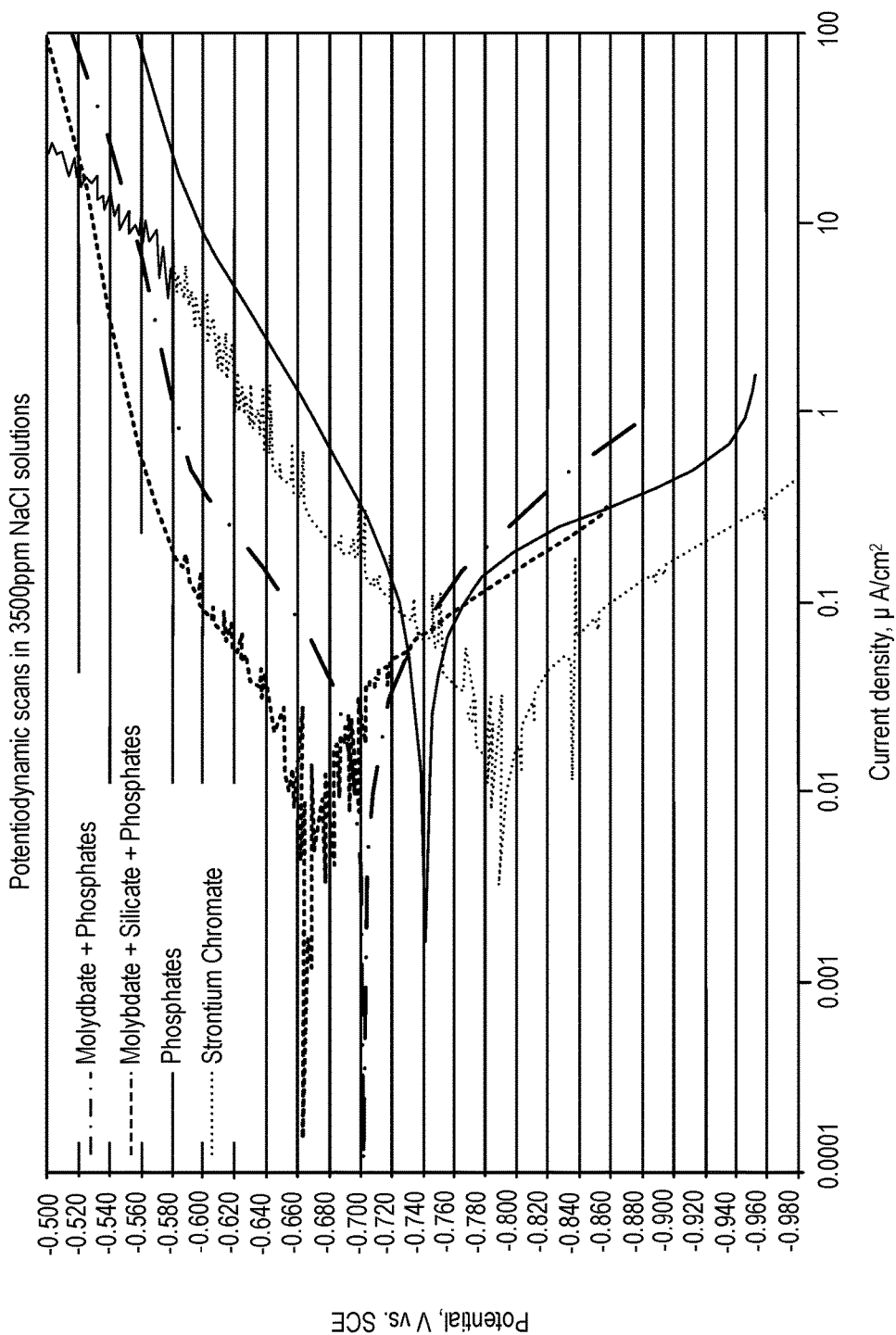
FIG. 3 illustrates potentiodynamic scans of various materials, including those of corrosion inhibition systems in accordance with various embodiments.

The corrosion inhibitive cation species and corrosion inhibitive anion species surprisingly show a synergistic effect at inhibiting corrosion on a substrate in response to co-existing within a solution. For example, with reference to FIG. 3, potentiodynamic scans are shown. As shown, there is a synergistic effect in preventing corrosion by combining the molybdate, silicate, and phosphate (corrosion inhibitive anion species), the mixture of which may include corrosion inhibitive cation species such as zinc ($Zn^{2+}$), calcium ($Ca^{2+}$), strontium ($Sr^{2+}$), and/or aluminum ($Al^{3+}$).

In various embodiments, the chemical conversion coating solution may be sprayed, brushed, or otherwise distributed or applied on the material coating of a substrate and allowed to dry to form the chemical conversion coating. For example, a chemical conversion coating solution may be applied by immersion of the substrate into the chemical conversion coating solution, or by using a brush and/or roller. A chemical conversion solution coating may also be applied by dipping or by spraying. Spraying may involve a pump style paint application system, with or without the use of air, to spray the chemical conversion coating solution onto the substrate. In various embodiments, spraying may involve the use of a propellant, such as a volatile hydrocarbon, to pressurize chemical conversion coating and propel the chemical conversion coating solution onto the substrate. In various embodiments, the substrate may be activated by exposure to an acid, such as nitric acid or phosphoric acid, prior to the application of the chemical conversion coating solution. In various embodiments, the chemical conversion coating solution may be applied to the plating material on the substrate and allowed to air dry at about 25° C. (77° F.). When used in this context only, the term "about" means plus or minus 5° C. (9° F.). In various embodiments, the chemical conversion coating solution may be rinsed with water prior to air drying. In various embodiments, the chemical conversion coating solution may be dried at elevated temperatures above 25° C. (77° F.) to form the chemical conversion coating.

White rust is a form of corrosion product that may affect substrates comprising zinc. For example, white rust may affect bare zinc and/or metals coated with zinc containing materials, such as Zn—Ni coated or plated steel, since the former functions as a sacrificial coating that protects a steel substrate from corroding. Exposure to water and carbon dioxide may cause zinc oxide and/or zinc hydroxide to form, which may be referred to as white rust, eventually leaving the steel substrate unprotected against corrosion. To aid in preventing this form of corrosion and/or to promote surface passivation, among other things, in accordance with various embodiments, it may be beneficial to coat a substrate with a corrosion inhibition composition applied onto the chemical conversion coating as part of the corrosion inhibition system, as described herein. This corrosion inhibiting composition may also protect the substrate at scratched or damaged areas, and/or areas where the sacrificial coating has failed.

A corrosion inhibition composition may comprise one or more materials that inhibit at least one form of corrosion of a substrate and/or promote surface passivation of a substrate. In various embodiments, a corrosion inhibition composition may comprise one or more constituent species that may be referred to as pigments or corrosion inhibition constituents. In various embodiments, the corrosion inhibition constituents may combine in a synergistic manner to help prevent corrosion of a substrate and/or promote surface passivation of a substrate.

A corrosion inhibition composition may be mixed with an application vehicle to aid the application of the corrosion inhibition composition to a substrate. An application vehicle may comprise one or more materials and/or a solvent that aid in the dispersing and/or application of a corrosion inhibition composition to a substrate. The material(s) in an application vehicle may be referred to as an application vehicle solid(s). For example, an application vehicle solid comprised in an application vehicle may include an organic resin matrix. In various embodiments, organic resin matrices used in application vehicles may include, without limitation, one or more of an epoxy, a polyurethane, an alkyd, a polysulfide, a silicone, an acrylic, or butadiene. Solvents comprised in an application vehicle may be organic or inorganic. In that regard, the corrosion inhibition composition with an application vehicle, and with or without a smart release adjunct, as described herein, may be referred to as a corrosion resistant coating. In various embodiments, the application vehicle may be a heat transfer fluid, machining coolant, lubricant, or any other suitable substance. The machining coolant may be, for example, a semi-synthetic water-based machining coolant.

As further described herein, the efficacy of the corrosion inhibition constituents is related to their solubilities. The higher solubility, the better inhibition the corrosion inhibition constituents tend to offer. However, using a high solubility corrosion inhibition constituent in corrosion resistant coatings may produce other issues in corrosion resistant coating application, such as formation of blistering, or a lack of long-term corrosion protection performance. Thus, a sparingly soluble corrosion inhibition composition may be beneficial. For example, in accordance with various embodiments, a corrosion inhibition composition may have a solubility of between 0.1 and 20 millimolar (mM) (where 1 mM=$10^{-3}$ mol/L), between 0.5 mM and 15 mM, and/or between 1 mM and 10 mM.

In that regard, a smart release adjunct may be used to enhance the solubility of a corrosion inhibition constituent, such as the molybdate compound, in corrosion inhibition compositions. A smart release adjunct may be any material that regulates the solubility of a corrosion inhibition constituent.

In various embodiments, a corrosion inhibition composition may regulate the corrosion current of a substrate in water and/or in sodium chloride water solution to values at or below those achieved with a saturated strontium chromate solution, with or without the presence of dissolved oxygen. In addition, a corrosion inhibition composition may maintain an open circuit potential (OCP) relationship of steel more cathodic than Cd, TiCd, and plated Zn alloys and/or maintain a corrosion current of Cd, TiCd and Zn alloy plating greater than steel. Substances such as silicate, molybdate and tungstate compounds tend to inhibit corrosion while elevating the open circuit potential of metals to differing degrees. Compounds such as rare earth metal cations, phosphates (such as zinc phosphate), benzoate, orthophosphates, phthalates, and/or salts of phthalic acid compounds inhibit corrosion while depressing the open circuit potential. In addition, corrosion inhibition compositions and corrosion inhibition organic coatings, in accordance with various embodiments, tend to preserve the galvanic relationship between zinc nickel and steel, where zinc nickel is sacrificial to steel, where the substrate is steel coated with (e.g., plated with) zinc nickel.

A corrosion inhibition composition may, in various embodiments, comprise a zinc oxide, a zinc phosphate, a calcium silicate, an aluminum phosphate, a zinc calcium strontium aluminum orthophosphate silicate hydrate, a molybdate compound, and/or a silicate compound. In various embodiments, the molybdate compound may be $ZnMoO_4$, $CaMoO_4$, and/or $MgMoO_4$. In various embodiments, the silicate compound may be $MgSiO_3$, $ZnSiO_3$, and/or $CaSiO_3$. A silicate compound comprising $MgSiO_3$ may be activated by heat treatment at a relatively lower temperature (i.e., activated at 260° C. (500° F.)), and/or may be activated by heat treatment at a relatively higher temperature (i.e., activated at 650° C. (1202° F.). In various embodiments, the zinc oxide, the zinc phosphate, the calcium silicate, the aluminum phosphate, the zinc calcium strontium aluminum orthophosphate silicate hydrate, collectively, may comprise between 10% and 90% by weight of the corrosion inhibition composition. In various embodiments, the molybdate compound may comprise between 10% and 90% by weight of the corrosion inhibition composition. In various embodiments, the silicate compound may comprise between 10% and 90% by weight of the corrosion inhibition composition. In various embodiments, the zinc oxide, the zinc phosphate, the calcium silicate, the aluminum phosphate, the zinc calcium strontium aluminum orthophosphate silicate hydrate, collectively, may comprise about 33% by weight of the corrosion inhibition composition, the molybdate compound may comprise about 33% by weight of the corrosion inhibition composition, and/or the silicate compound may comprise about 33% by weight of the corrosion inhibition composition. As used in this context only, the term "about" means plus or minus 5 weight %.

As described above, one or more smart release adjuncts may be used in a corrosion resistant coating. The smart release adjunct aids in the solubility of the corrosion inhibition composition. In various embodiments, a complexing agent (e.g., nicotinic acid or a salt of nicotinic acid, ethylenediaminetetraacetic acid (EDTA), nitrilotracetic acid (NTA), oxalic acid, formic acid, acetic acid, tartaric acid, nicotinic acid, citric acid, or malonic acid) is used as a smart release adjunct to increase the solubility of the pigments. In various embodiments, an anion (e.g., the oxalate anion $C_2O_4^{2-}$ of $MgC_2O_4^2$) is used as a smart release adjunct to react with a targeted cation (e.g., $Zn^{2+}$), forming the less soluble $ZnC_2O_4$ thus increasing the solubility of $ZnMoO_4$/$ZnSiO_3$ pigments. In various embodiments, $MgSiO_3$ combined with $ZnMoO_4$ is used as smart release adjunct with a corrosion inhibition composition.

Figure 1B:
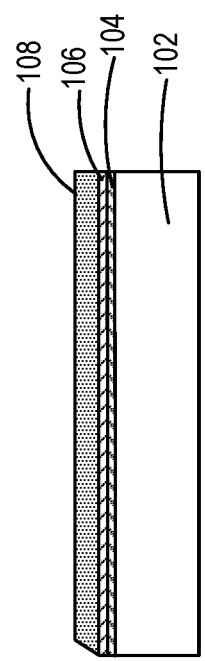

With reference to FIG. 1A, substrate 102 is shown coated with plating material 104, which may comprise Zn and/or Ni, and/or Cd or TiCd. In addition, substrate 102 is shown coated in chemical conversion coating 106 disposed adjacent to plating material 104. Chemical conversion coating 106 may comprise a corrosion inhibitive cation, a corrosion inhibitive anion, and a complexing agent, as described herein. With reference to FIG. 1B, substrate 102 is shown being additionally coated with a corrosion inhibition composition 108 disposed adjacent to chemical conversion coating 106, as described herein.

Figure 4:
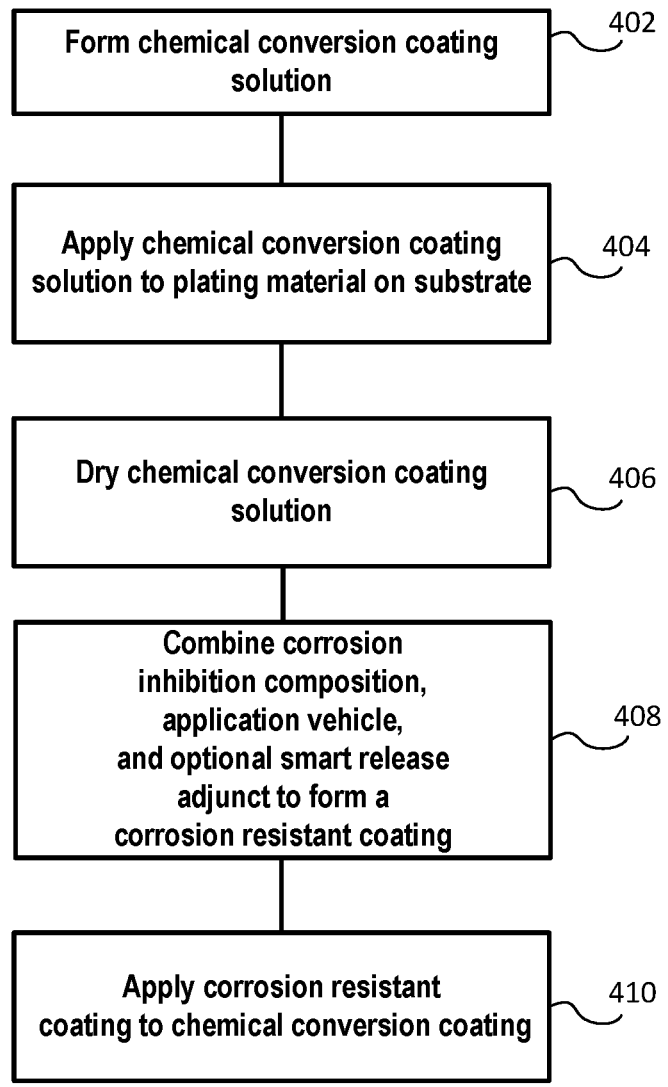
FIG. 4 illustrates a method of applying a corrosion inhibition system, in accordance with various embodiments.

With reference to FIG. 4, method 400 for applying a corrosion inhibition system to a substrate is illustrated. With combined reference to FIGS. 1B and 4, a chemical conversion coating solution may be formed (step 402) by combining a solvent (i.e., water), a corrosion inhibitive cation such as those discussed herein, a corrosion inhibitive anion such as those discussed herein, and a complexing agent. During the forming of the chemical conversion coating solution, the chemical conversion coating solution may be maintained at a temperature between 5° C. (41° F.) and 90° C. (194° F.), 15° C. (59° F.) and 50° C. (122° F.), or 25° C. (77° F.) and 30° C. (86° F.). In various embodiments, the chemical conversion coating solution may additionally comprise an application vehicle. Chemical conversion coating solution may be applied to plating material 104 on substrate 102 (step 404) by any of the methods described herein. In embodiments in which substrate 102 is immersed in the chemical conversion coating solution, substrate 102 may be immersed for 0.05 to 20 minutes, 0.5 to 10 minutes, or 1 to 5 minutes. Chemical conversion coating solution may subsequently be dried (step 406) to form a chemical conversion coating 106 adjacent to plating material 104. In various embodiments, a corrosion inhibition composition and an application vehicle may be combined to form a corrosion resistant coating (step 408). In various embodiments, a smart release adjunct may be combined with the corrosion inhibition composition and the application vehicle to form the corrosion resistant coating. The corrosion inhibition composition may comprise a zinc oxide, a zinc phosphate, a calcium silicate, an aluminum phosphate, a zinc calcium strontium aluminum orthophosphate silicate hydrate, a molybdate compound, and/or a silicate compound. The corrosion resistant coating may be applied to the chemical conversion coating (step 410), by being painted or otherwise distributed or applied and allowed to dry. For example, a corrosion resistant coating may be applied using a brush and/or roller. A corrosion resistant coating may also be applied by dipping or by spraying. Spraying may involve a pump style paint application system, with or without the use of air, to spray the corrosion resistant coating onto the substrate. In various embodiments, spraying may involve the use of a propellant, such as a volatile hydrocarbon, to pressurize the corrosion resistant coating and propel the corrosion resistant coating onto the substrate. Step 410 may be repeated one or more times to build one or more layers onto the substrate.

In various embodiments described herein, the chemical conversion coating solution comprises a solvent, a corrosion inhibitive cation(s), a corrosion inhibitive anion(s), and a complexing agent. The chemical conversion coating, resulting from the drying of the chemical conversion coating solution, may comprise a corrosion inhibitive cation (such as zinc ($Zn^{2+}$), calcium ($Ca^{2+}$), strontium ($Sr^{2+}$), magnesium ($Mg^{2+}$), and/or aluminum ($Al^{3+}$), a corrosion inhibitive anion (such as molybdate, silicate, and/or phosphate), and a complexing agent so the cation and anions do not react with one another in solution, and the corrosion inhibition composition may comprise similar species (a molybdate compound, a silicate compound, and compounds comprising zinc, phosphate, calcium, aluminum, magnesium, and strontium ions), which may or may not be disassociated in solution. The chemical conversion coating and the corrosion inhibition composition having similar chemical species may serve to stabilize the interface between chemical conversion coating and the corrosion inhibition composition on the substrate. Such stabilization may minimize or eliminate migration and displacement reactions between the coatings, causing the corrosion inhibition system comprising the plating material, chemical conversion coating, and corrosion inhibition composition to better inhibit corrosion of the underlying substrate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of disposing a corrosion resistant system to a substrate, comprising:
    applying a plating material to the substrate;
    forming a chemical conversion coating solution by combining a solvent, at least one corrosion inhibitive cation comprising at least one of zinc, calcium, strontium, magnesium or aluminum, at least one corrosion inhibitive anion comprising at least one of phosphate, molybdate, or silicate, and a complexing agent;
    applying the chemical conversion coating solution to the plating material on the substrate;
    drying the chemical conversion coating solution to form a chemical conversion coating, wherein the chemical conversion coating comprises the at least one corrosion inhibitive cation comprising at least one of zinc, calcium, strontium, magnesium or aluminum, the at least one corrosion inhibitive anion comprising at least one of phosphate, molybdate, or silicate, and the complexing agent; and
    applying a corrosion resistant coating to the chemical conversion coating, wherein the corrosion resistant coating comprises a corrosion inhibition composition and an application vehicle, and
    wherein the corrosion inhibition composition comprises a zinc oxide, a zinc phosphate, a calcium silicate, an aluminum phosphate, a zinc calcium strontium aluminum orthophosphate silicate hydrate, a molybdate compound, and a silicate compound.

2. The method of claim 1, wherein each of the at least one corrosion inhibitive cation has a concentration in a range of $0.5 \times 10^{-3}$ molar to 0.5 molar in the chemical conversion coating solution.

3. The method of claim 1, wherein each of the at least one corrosion inhibitive anion has a concentration in a range of $0.5 \times 10^{-3}$ molar to 0.5 molar in the chemical conversion coating solution.

4. The method of claim 3, wherein the silicate has a concentration in a range of 0.005 molar to 0.02 molar in the chemical conversion coating solution.

5. The method of claim 4, wherein the forming the chemical conversion coating further comprises adding an organic binder into the chemical conversion coating solution.

6. The method of claim 5, wherein the organic binder comprises at least one of polyvinyl alcohol, polyvinylpyrrolidone, polyvinyl acetate, or an acrylic.

7. The method of claim 1, wherein the complexing agent has a concentration in a range of $0.5 \times 10^{-3}$ molar to 0.5 molar in the chemical conversion coating solution.

8. The method of claim 1, wherein the corrosion inhibitive cation is provided by at least one of zinc chloride, zinc sulfate, zinc nitrate, zinc molybdate, calcium molybdate, magnesium molybdate, zinc silicate, magnesium silicate, calcium silicate, zinc oxide, zinc phosphate, aluminum phosphate, magnesium phosphate, calcium phosphate, zinc calcium strontium aluminum orthophosphate silicate, calcium chloride, calcium sulfate, calcium nitrate, strontium chloride, strontium sulfate, strontium nitrate, aluminum chloride, aluminum sulfate, or aluminum nitrate.

9. The method of claim 1, wherein the corrosion inhibitive anion is provided by at least one of sodium phosphate, sodium silicate, sodium vanadate, zinc molybdate, calcium molybdate, sodium molybdate, magnesium molybdate, zinc silicate, magnesium silicate, calcium silicate, sodium silicate, zinc phosphate, aluminum phosphate, magnesium phosphate, calcium phosphate, zinc calcium strontium aluminum orthophosphate silicate, sodium nitrite, phosphoric acid, silicic acid, vanadic acid, and/or molybdic acid.

10. The method of claim 1, wherein the complexing agent comprises at least one of ethylenediaminetetraacetic acid (EDTA), nitrilotracetic acid (NTA), oxalic acid, formic acid, acetic acid, tartaric acid, nicotinic acid, citric acid, or malonic acid.

11. The method of claim 1, wherein the silicate compound comprises between 10% and 90% by weight of the corrosion inhibition composition.

12. The method of claim 1, wherein the zinc oxide, the zinc phosphate, the calcium silicate, the aluminum phosphate, and the zinc calcium strontium aluminum orthophosphate silicate hydrate, collectively, comprise between 10% and 90% by weight of the corrosion inhibition composition.

* * * * *

UNITED STATES PATENT AND TRADEMARK OFFICE
CERTIFICATE OF CORRECTION

Page 1 of 1

PATENT NO. : 10,465,292 B2
APPLICATION NO. : 15/288972
DATED : November 5, 2019
INVENTOR(S) : Michael A. Kryzman et al.

It is certified that error appears in the above-identified patent and that said Letters Patent is hereby corrected as shown below:

On the Title Page

Item [54], and in the Specification, Column 1 Line 2 should read:
ANTI-CORROSION AND/OR PASSIVATION COMPOSITIONS FOR METAL-CONTAINING SUBSTRATES AND METHODS FOR MAKING, ENHANCING, AND APPLYING THE SAME Signed and Sealed this
Third Day of March, 2020

Andrei Iancu
*Director of the United States Patent and Trademark Office*